United States Patent
Odmark

[15] 3,643,132
[45] Feb. 15, 1972

[54] PROTECTIVE ASSEMBLY FOR A PANEL-MOUNTED CALL METER WITH ELASTIC HOUSING-LOCKING MEANS

[72] Inventor: Per Ranold Odmark, Alvsjo, Sweden

[73] Assignee: Telefonaktiebolaget LM Ericsson, Stockholm, Sweden

[22] Filed: Feb. 19, 1970

[21] Appl. No.: 12,807

[30] Foreign Application Priority Data

Mar. 19, 1969 Sweden..................................3807/69

[52] U.S. Cl. ............................317/107, 248/27, 339/126 R
[51] Int. Cl..........................................H02b 1/02, H02b 9/00
[58] Field of Search..................317/104, 105, 107, 110, 111; 248/27; 339/126 R, 126 RS

[56] References Cited

UNITED STATES PATENTS

| | | | |
|---|---|---|---|
| 3,091,679 | 5/1963 | Norden | 339/126 RS |
| 3,201,786 | 8/1965 | Andersen | 339/126 R X |
| 3,319,909 | 5/1967 | Goslin | 248/27 |
| 3,408,617 | 10/1968 | Broyles | 339/126 |
| 3,475,718 | 10/1969 | Hartz | 339/128 X |

Primary Examiner—Lewis H. Myers
Assistant Examiner—Gerald P. Tolin
Attorney—Hane & Baxley

[57] ABSTRACT

An arrangement for mounting a call meter on a panel and at the same time protecting the meter. The arrangement consists of two hollow parts. One of the parts is inserted through an opening in the panel and the meter is placed in this part. The other part is telescoped on the one part and rests against the panel. The parts are locked in this position with snap action between the two parts.

3 Claims, 3 Drawing Figures

PATENTED FEB 15 1972
3,643,132
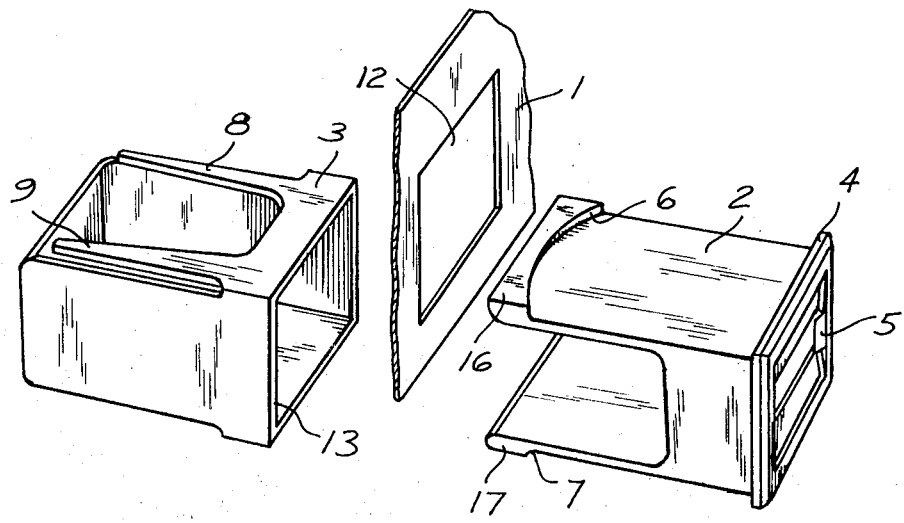
FIG. 1
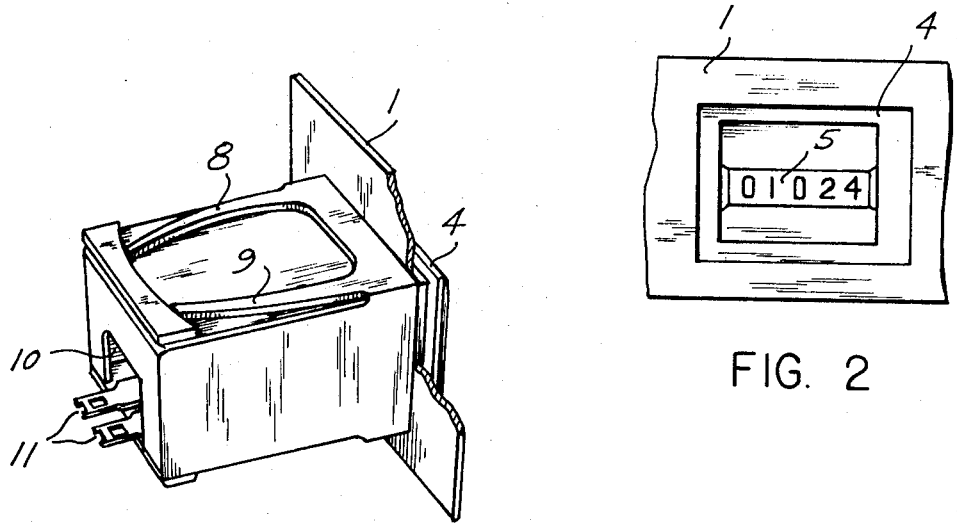
FIG. 3
FIG. 2
INVENTOR.
PER RANOLD ÖDMARK
BY
Hane and Baxley
ATTORNEYS

A PROTECTIVE ASSEMBLY FOR A PANEL-MOUNTED CALL METER WITH ELASTIC HOUSING-LOCKING MEANS

The present invention relates to a combined protective cover and mounting arrangement for call meter in telephone exchanges. At the known arrangements the call meter is generally secured by screws and nuts to a supporting plate. Each call meter is furthermore provided with a protective cover which is put about the meter. The invention is specially characterized as it is defined in the claims and whereby an improvement and simplification is achieved, compared with the known arrangements. The cover serves not only as protection for a meter put in it but comprises simultaneously a supporting cover for the same. Owing to the fact that the meter does not need to be provided with any screw arrangement for its fastening on a supporting plate, the construction of the call meter is also simplified so that it does not need to be so robust as the known meters.

The invention will now be described by means of an embodiment with reference to the accompanying drawing, on which FIG. 1 shows an exploded view including an apertured elongate panel with cover parts located on each side of it, FIG. 2 shows a front view of an assembled meter, and FIG. 3 shows a perspective view of the protective cover seen from the back of the panel.

An elongate support panel 1 is provided with openings 12 for montage of call meters. The protective cover includes a front cover part 2 and a back cover part 3. Both cover parts are preferably made of plastic front cover part 2 has such cross-sectional dimensions, that it can be pushed into one of the openings 12. At its front end it is provided with a flange 4 which also constitutes a frame for a window 5 on the front side of the cover part, through which digits of a call meter placed in it can be observed. At its back end the cover part is along the upper edge provided with a strengthening strip 16 and along the lower edge with a strengthening strip 17. Both strengthening strips have a curved front edge 6 and 7 respectively. For insertion in the opening 12 these strips are pressed a little toward each other so that they can pass through the opening 12 whereupon the cover part is pushed in until the flange 4 lies against the front of panel 1.

The back cover part is at its front end of such dimensions that it can be slid upon the cover part 2, whereby of course also in this case the strengthening strips 16 and 17 at the putting on are pressed a little toward each other. When the cover part 3 has been completely pushed upon the cover part 2, its front edge 13 will contact the back side of panel 1. The cover part 3 is on its upper side provided with two elastic arms 8 and 9. These are of such length that when the cover parts are completely pushed together, the tips on the arms 8 and 9 when they are pressed a little toward each other, can be forced to abut against the curved front edge 6 on the strengthening and locking strip 16. Accordingly, when in contact with this edge they will due to their elasticity press the cover part 3 against the back side of the panel while the cover part 2 is pushed in opposite direction so that the flange 4 presses against the front of the panel. Two similar arms are on the lower side of the cover part 3, where they cooperate with the curved edge 7 on the strengthening and locking strip 17.

The cover part 2 provides a space sufficient to insert of a call meter. The call meter thereinto is not shown in detail but is indicated in FIG. 2 by digits visible in the window 5 and in FIG. 3 by soldering tabs 11 projecting from a back opening 10 in the cover part 3.

I claim:

1. A protective assembly for panel mounting a call meter, said assembly comprising in combination:

a panel including a mounting opening; and a two-part protective cover, said cover comprising an open-ended hollow front part having at one end an outwardly protruding stop member and an outer peripheral outline slidably fitting into said mounting opening; said front part being slidably received in the opening of the panel from one side thereof and into engagement with said stop member;

a hollow rear part open on at least one end, said rear part having an inner peripheral outline and a length such that it is slidably received on the portion of the front part protruding from the other side of the panel into a position of overlap in which its open end abuts against said other panel side, said rear part being in said overlap position, said front and rear parts each having a substantially rectangular cross section defining four sidewalls, two opposite sidewalls of the front part being slotted at the other end of said part whereby the two other opposite sides of the front part define two flexible wall portions at said other end, the peripheral outline of the panel opening and the inner peripheral outline of the open end of the rear part being dimensioned with reference to the outer peripheral outline of the slotted end of the front part so that the front part is received in the panel opening and the rear part is received upon the front part, said front part being slid through said panel opening and said rear part being then slid upon the front part whereby upon release of said two wall portions the two cover parts are held together and to the panel by a pressure fit, said cover parts in conjunction defining a space for accommodating a call meter to be housed therein, an elastically coacting locking means on the front part and the rear part oppositely biasing said parts into the overlap position thereof pressing said stop member on the front part against said one side of the panel and said open end of the rear part against the other side of the panel thereby locking the two cover parts to the panel, said elastically coacting locking means comprising a locking strip secured on a wall portion of the front part adjacent to the other end thereof, and two spaced-apart flexible tongues formed of a sidewall portion of the rear part, said tongues extending from the open end of the rear part into pressure engagement with the facing edge of the strip thereby pressing the two cover parts in opposite direction.

2. The assembly according to claim 1 wherein said stop member comprises an outwardly protruding peripheral flange on said one end of the front part.

3. The assembly according to claim 1 wherein said facing edge of the strip is concavely curved with reference to the panel thereby facilitating deformation of said flexible tongues into the position of pressure engagement with said edge.

* * * * *